United States Patent
Wang et al.

(10) Patent No.: US 8,060,897 B2
(45) Date of Patent: Nov. 15, 2011

(54) RESTRAINING DEVICE OF OPTICAL DISK DRIVE

(75) Inventors: Yu-Sheng Wang, Guishan Shiang (TW); Jen-Chen Wu, Guishan Shiang (TW)

(73) Assignee: Quanta Storage Inc., Guishan Shiang (TW)

( * ) Notice: Subject to any disclaimer, the term of this patent is extended or adjusted under 35 U.S.C. 154(b) by 558 days.

(21) Appl. No.: 12/239,474

(22) Filed: Sep. 26, 2008

(65) Prior Publication Data

US 2009/0138899 A1  May 28, 2009

(30) Foreign Application Priority Data

Nov. 23, 2007  (TW) ................................ 96144698 A

(51) Int. Cl.
*G11B 17/04* (2006.01)
(52) U.S. Cl. ...................................................... 720/651
(58) Field of Classification Search ........................ None
See application file for complete search history.

(56) References Cited

U.S. PATENT DOCUMENTS

| | | | | |
|---|---|---|---|---|
| 6,002,659 A * | 12/1999 | Ogusu et al. | ................... | 720/641 |
| 6,918,127 B2 * | 7/2005 | Maeda et al. | ................. | 720/620 |
| 7,814,504 B2 * | 10/2010 | Aoki et al. | ..................... | 720/624 |
| 7,849,473 B2 * | 12/2010 | Fukasawa et al. | ............ | 720/661 |
| 7,853,963 B2 * | 12/2010 | Shimomae | ..................... | 720/623 |
| 2003/0099182 A1 * | 5/2003 | Maeda et al. | ................. | 369/77.1 |
| 2006/0143631 A1 * | 6/2006 | Watanabe | ..................... | 720/621 |
| 2006/0212885 A1 * | 9/2006 | Onuma et al. | ................. | 720/622 |
| 2009/0125927 A1 * | 5/2009 | Fukasawa et al. | ............ | 720/661 |
| 2010/0031278 A1 * | 2/2010 | Ueno et al. | ..................... | 720/601 |

* cited by examiner

*Primary Examiner* — Mark Blouin
(74) *Attorney, Agent, or Firm* — C. G. Mersereau; Nikolai & Mersereau, P.A.

(57) ABSTRACT

The invention is to provide a restraining device of an optical disk drive in which a traverse is disposed. A transmission unit rotates a roller to, load/unload a disc, and drives a slider to move the roller. The transmission unit includes the restraining device moving with the roller. When the optical disk drive carries a disc, the slider moves to release the traverse and push down the roller to move the restraining device away from the vibration range of the traverse. When the optical disk drive does not carry a disc, the slider moves to restrain the traverse and release the roller to move the restraining device close to the front end of the traverse. The vibration range of the traverse is restrained to protect the gear teeth from damage.

8 Claims, 3 Drawing Sheets

RESTRAINING DEVICE OF OPTICAL DISK DRIVE

FIELD OF THE INVENTION

The invention relates to an optical disk drive, more particularly a restraining device in an optical disk drive to restrain the vibration range of a traverse upon impact.

BACKGROUND OF THE INVENTION

Because data marks on the optical discs are miniscule, an optical disk driver must be equipped with precision optical apparatus and fast transmission mechanism coupled with a rapid-response control system to read and write data on the disc accurately. To prevent external impact from adversely affecting the read/write performance of the disk drive, the disk drive must have a protective device in place to cushion the shock.

FIG. 1 shows the side of a conventional slot-in optical disk drive 100. The slot-in optical disk drive 100 has a traverse 101 equipped with precision components and supported by the damper 102 to dispose on the bottom surface of its housing 103 and to reduce the vibration occurred under impact. The traverse 101 is sidewardly and protrudingly disposed with an immovable shaft 104 at its rear end. The immovable shaft 104 can be fitted into a limiting slot 106 situated at the rear end of a slider 105 to further restrain the vibration of traverse 101. The slider 105 is triggered by the inserted disc (not shown in the figure) that causes the slider 105 to move towards the front of the optical disk drive 100 in a direction indicated by the arrow, thereby enabling the gear racks 107 thereon to move forward along with the slider 105 to engage the transmission gear assembly 108 of the optical disk drive 100. The transmission gear assembly 108 then continues to drive the slider 105 forward to oppose a spring 109 with one end secured to the housing 103 and the other end hooked to the slider 105 such that the front inclined guide surface 110 of the slider 105 would push the protruding axle pin 112 of the roller 111. After the roller 111 drives the disc into the optical disk drive 100, it would lower its height to disengage from the surface of disc. At the same time, the limiting slot 106 that has moved forward along with the slider 105 would disengage the immovable shaft 104 to enable the traverse 101 to turn the optical disc under the shock support of the damper 102.

When the optical disk drive 100 turns the transmission gear assembly 108 in reverse direction to unload the disc, the transmission gear assembly 108 drives the gear racks 107, causing the slider 105 to move backwards and its inclined guide surface 110 to disengage the axle pin 112, and the roller 111 to rise in contact with the disc. The roller 111 then rolls to unload the disc from the optical disk drive 100. The limiting slot 106 that backs up along with the slider 105 would again hold the immovable shaft 104. When the transmission gear assembly 108 stops turning after the disc unloading is completed, it is pulled back under the recoil force of the spring 109, upon which, the gear racks 107 of the slider 105 disengage the transmission gear assembly 108 and position at the rear end of the optical disk drive 100 to restrain the vibration range of the unloaded traverse 101, thereby preventing it from colliding and damaging the adjacent mechanism that awaits to guide the loading of optical discs.

As shown, the slider 105 of a conventional optical disk drive 100 would be pushed into position at the rear end of the optical disk drive 100 by the recoil force of the spring 109 alone after it disengages the transmission gear assembly 108. When the optical disk drive 100 is under impact, in particular in the case of portable or vehicle-mounted disk drive, the slider 105 armed with greater inertia force from the traverse 101 would ram into the adjacent gear racks 107 when it slides forward against the elastic force of the spring 109, causing damage to the gear racks 107 or the gears of the transmission gear assembly 108, especially if the gears are made of plastic with weaker structural strength for the sake of reducing weight and costs. Once the gears are damaged, the optical disk drive will not be able to function normally and product becomes less reliable. Hence the restraint of traverse vibration in conventional optical disk drives poses a problem that needs to be addressed.

SUMMARY OF THE INVENTION

The object of the invention is to provide a restraining device of optical disk drive, which, by disposing a restraining post on the transmission gear assembly, restrains the vibration range of traverse when the optical disk drive does not carry a disc, thereby preventing damage to the gears and enhancing the reliability of the optical disk drive.

Another object of the invention is to provide a restraining device of optical disk drive, which uses a restraining post to ascend or descend with the roller to restrain or move away from the vibration range of the traverse so that the shock absorption mechanism of the traverse will not be interfered with during normal read/write.

To achieve the aforesaid objects, the invention provides a restraining device of an optical disk drive in which a traverse is disposed. A transmission unit rotates a roller to load/unload a disc, and drives a slider to move the roller. The transmission unit includes the restraining device moving with the roller. When the optical disk drive does not carry a disc, the slider moves to restrain the traverse and release the roller to move the restraining device close to the front end of the traverse so as to restrain the vibration range of the traverse. When the optical disk drive carries a disc, the slider moves to release the traverse and push down the roller to move the restraining device away from the vibration range of the traverse.

The transmission unit further comprises a gear transmission set disposed on the side of the traverse. The gear transmission set consists of a first gear transmission member, a second gear transmission member, and a linkage gear that transmit interactively. The first gear transmission member is for rotating the roller; the second gear transmission member is for driving the slider; and the linkage gear links up with the first gear transmission member and the second gear transmission member using an inner and an outer positioning plate respectively so as to move interactively with the first gear transmission member and the second gear transmission member. The restraining device is disposed on the inner positioning plate that links up the linage gear and the second gear transmission member. The inner positioning plate is protrudingly disposed with a restraining post towards the optical disk drive to form the restraining device. When the optical disk drive is not loaded with a disc, the slider is secured at the rear end of the optical disk drive by a spring such that the gear racks on the slider are disengaged from the second gear transmission member with a distance formed therebetween. Such distance exceeds the space between the restraining device and the traverse when the former moves close to the latter. When the optical disk drive is loaded with a disc, the slider moves to push down the roller, which drives the downward movement of the positioning plate such that the restraining device on the positioning plate is away from the vibration range of the traverse.

DETAILED DESCRIPTION OF THE INVENTION

The objects, technical means and functions of the invention are described in detail with examples and accompanying drawings below.

Figure 2:
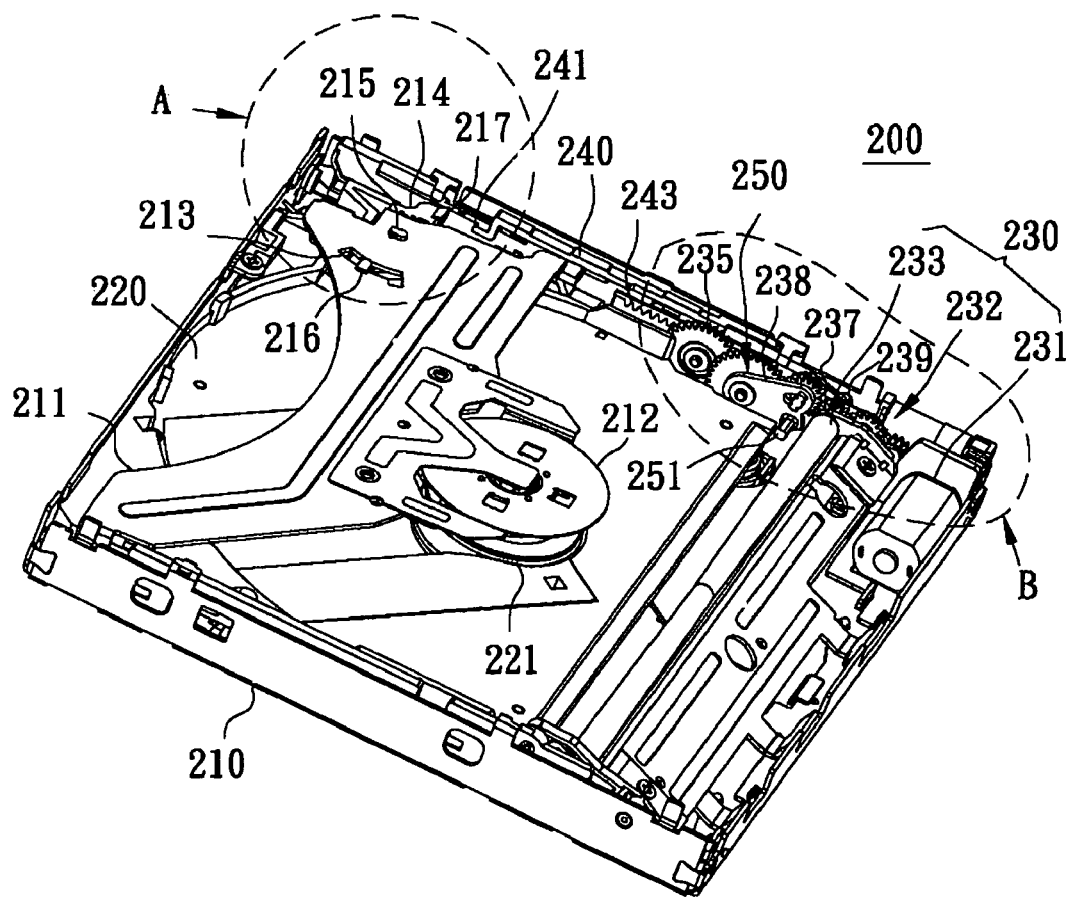
FIG. 2 is a three-dimensional view showing the interior structure of an optical disk drive disposed with a restraining device according to the invention.
Figure 3:
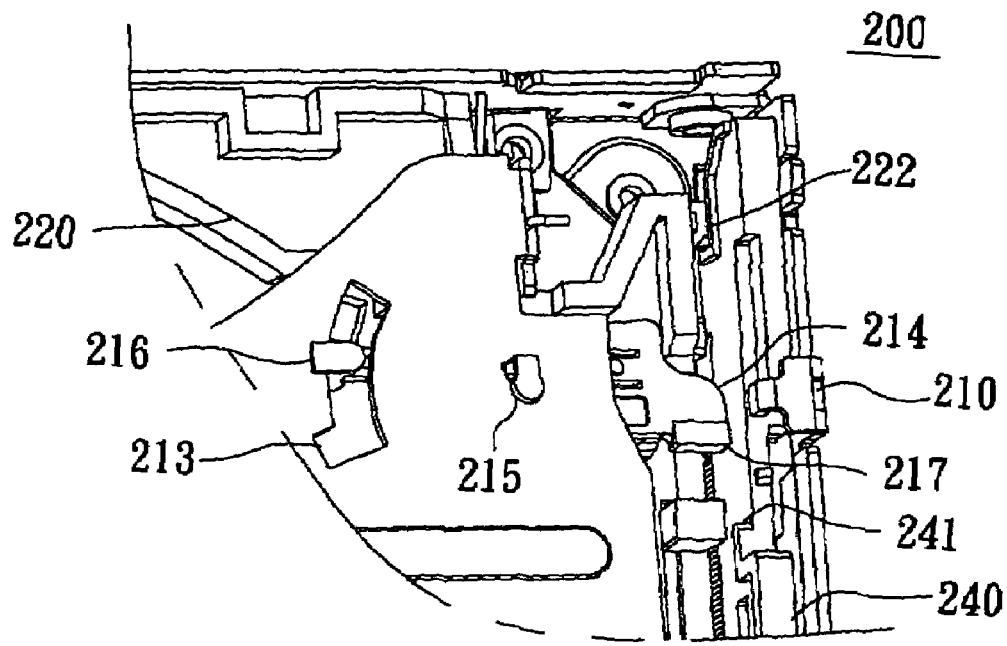
FIG. 3 is a partially enlarged view of FIG. 2 showing area A.
Figure 4:
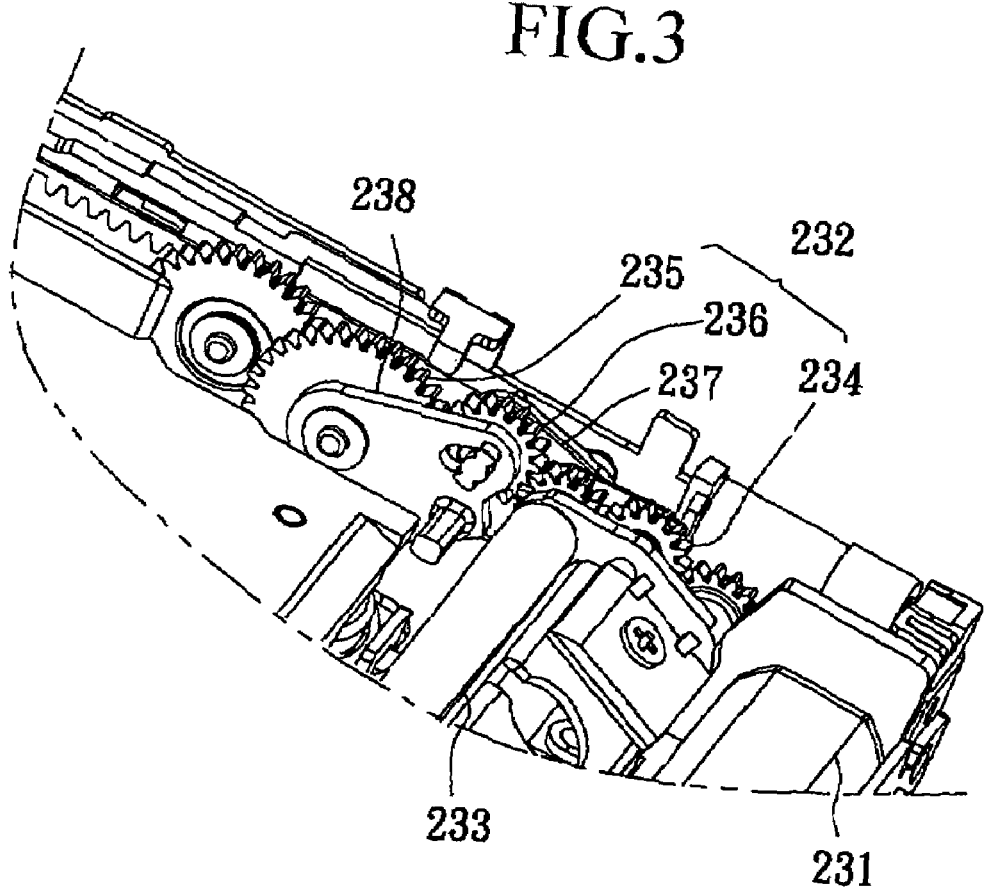
FIG. 4 is a partially enlarged view of FIG. 2 showing area B.

Referring to FIGS. 2, 3 and 4, FIG. 2 is a three-dimensional view showing the interior structure of an optical disk drive 200 disposed with a restraining device according to the invention; FIG. 3 is a partially enlarged view of FIG. 2 showing area A; and FIG. 4 is a partially enlarged view of FIG. 2 showing area B. The optical disk drive 200 of the invention comprises a housing 210, a traverse 220, a transmission unit 230, a slider 240 and a restraining device 250. The traverse 220 is disposed inside the housing 210 where the transmission unit 230 drives an optical disc (not shown in the figure) into position in or out of the traverse 220, and drives the slider 240 moving back and forth to enable the restraining device 250 to move away from or restrain the vibration range of traverse 220.

The housing 210 has a hollow interior with a clamp mechanism 211 secured at the top end of the hollow interior, the clamp mechanism 211 able to perform limited overturn using the end secured to the housing 210 as pivot axis such that the clamp holder 212 disposed at the front end could ascend or descend. An arc-shaped hole 213 is arranged on a side at the rear end of the clamp mechanism 211. A shaft lever 214 is securely positioned at the lower portion of the clamp mechanism 211 near the arc-shaped hole 213 that rotates around fulcrum 215 such that a guide pin 216 at the end of the shaft lever 214 would protrude upwardly through the arc-shaped hole 213 and move along with the arc-shaped hole 213. The lever head 217 at the front end of shaft lever 214 extends from the side of clamp mechanism 211.

The traverse 220 is in plate shape disposed in the hollow interior of housing 210 and supported by a damper (not shown in the figure) on the bottom surface of the optical disk driver 200. The traverse 220 has a spindle motor 221 at the center, which is situated exactly beneath the clamp holder 212 such that when the clamp holder 212 descends, the optical disc is clamped over the spindle motor 221 for the spindle motor 221 to turn the disc. The traverse 220 is sidewardly and protrudingly disposed with an immovable shaft 222 at the corner near the shaft lever 214.

The transmission unit 230 includes a transmission motor 231, a gear transmission set 232 and a roller 233. The transmission motor 231 is disposed at the front end of the housing 210 to provide the source, of power for the optical disk drive 200 to load and unload discs. The gear transmission set 232 is arranged at a side of the housing 210 and closely adjacent to a side of the traverse 220. The gear transmission set 232 comprises a plurality of gears that transmit interactively, including a first gear transmission member 234, a second gear transmission member 235 and a linkage gear 236. One end of the first gear transmission member 234 is connected to the transmission motor 231 and rotated by the transmission motor 231. The other end of the first gear transmission member 234 is rotatably and horizontally disposed on the roller 233 near the front end of housing 210 where discs in the optical disk drive 200 are loaded or unloaded by the forward or reverse rotation of the roller 233. The end of the first gear transmission member 234 that transmits the roller 233 is disposed with a rotatable outer positioning plate 237. The other end of the outer positioning plate 237 is secured to the outer side of the linkage gear 236 such that the linkage gear 236 and the first gear transmission member 234 stay engaged. One end of the second gear transmission member 235 is connected to a rotatable inner positioning plate 238. The other end of the inner positioning plate 238 is secured to the inner side of the linkage gear 236 such that the linkage gear 236 and the second gear transmission member 235 stay engaged.

Figure 1:
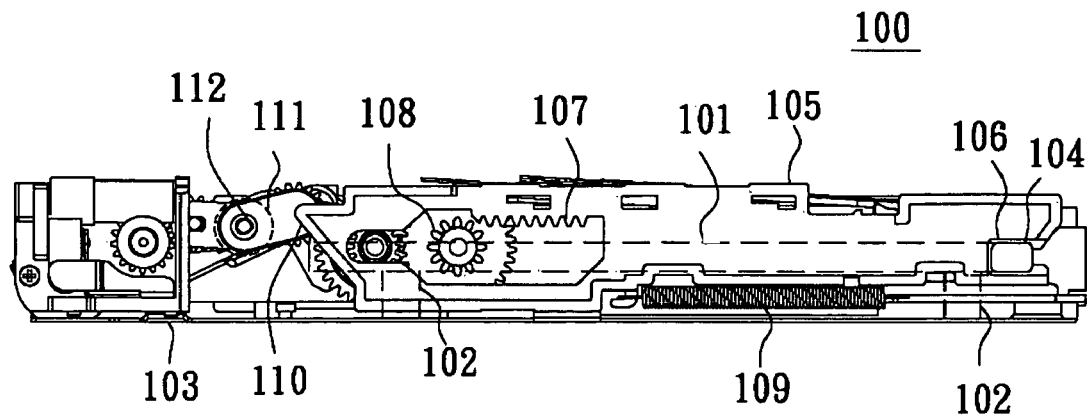
FIG. 1 is side view of a conventional slot-in optical disk drive.
Figure 5:
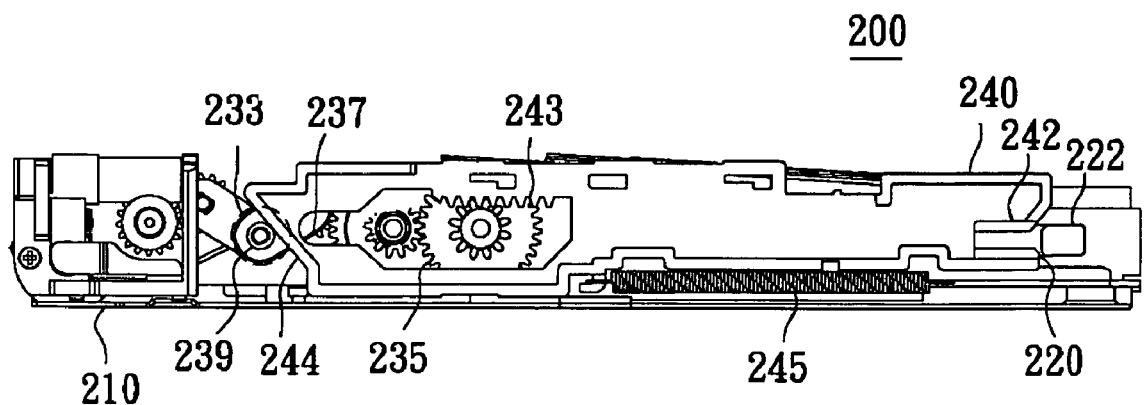
FIG. 5 is a side view of the optical disk drive according to the invention.

The slider 240 is a long strip shape disposed on the side of the housing 210 near the shaft lever 214 and the gear transmission set 232 that slides back and forth confiningly along the side of the housing 210. The inner side of the slider 240 is disposed with a flange 241, the flange 241 being situated on the moving path of the lever head 217 when the shaft lever 214 rotates. FIG. 5 shows the side view of the optical disk drive 200 with the housing 210 removed. A limiting slot 242 is disposed at the rear end of the slider 240, the limiting slot 242 having a size allowing the exact fitting of the positioning shaft 222 such that the slider 240 could hold or release the traverse 220. The slider 240 is disposed with a gear rack 243 near its middle portion, which could engage or disengage the second gear transmission member 235. When engaged, the slider 240 moves forth or back as driven by the second gear transmission member 235. The slider 240 has an inclined guide surface 244 at the front. The moving path of the inclined guide surface 244 passes through an axle pin 239 of the roller 233 that protrudes form the outer positioning plate 237. The slider 240 is disposed with a spring 245 at the bottom. One end of the spring 245 is secured to the housing 210, while the other end is hooked to the slider 240. The pull-back force of the spring 245 holds the slider 240 such that the gear rack 243 disengages the second gear transmission member 235 with a space therebetween, and the slider 240 is securely positioned at the rear end of the housing 210 (see FIG. 1) that enables the limiting slot 242 to hold the positioning shaft 222 so as to restrain the traverse 220.

Again referring to FIG. 2, the restraining device 250 of the invention is inwardly and protrudingly disposed with a restraining post 251 on the inner side of the inner positioning plate 238 such that the restraining post 251 would ascend or descend along with the movement of the inner positioning plate 238. When the traverse 220 does not carry a disc, the slider 240 is positioned at the rear end of the housing 210, the slider 240 is not in contact with the axle pin 239, and the roller 233 is situated at a high point, upon which, the linkage gear 236 that moves with the outer positioning plate 237 enables the inner positioning plate 238 to rise as well. This results in the restraining post 251 blocking the front of the traverse 220 with a space between them that is smaller than the normal vibration magnitude of the traverse 220. In addition, the distance of the gear rack 243 apart from the second gear transmission member 235 exceeds the space (ex. less than 2 mm) between the restraining post 251 and the traverse 220. Thus when the optical disk drive 200 is under impact, the traverse 220, when it thrusts forward, would ram into the restraining post 251 nearby and blocked by it so that the forward movement of slider 240 as pulled by the positioning shaft 222 (see FIG. 3) would be stopped to prevent the gear rack 243 from hitting the farther away second gear transmission member 235 and causing damage.

Figure 6:
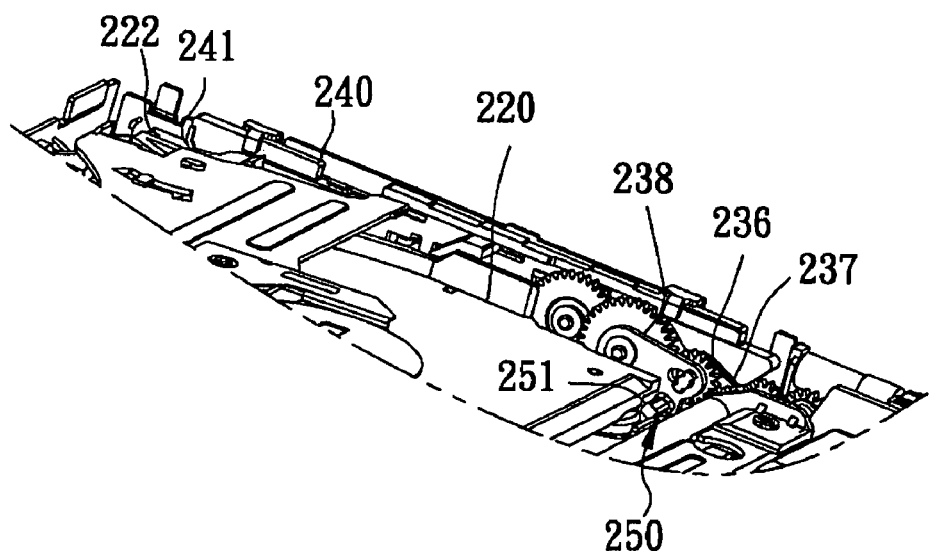
FIG. 6 is a three-dimensional view showing the restraining device of the invention releasing the traverse.

Again referring to FIG. 3, when a disc is loaded and moved to the rear end of the optical disk drive 200, the edge of the disc would push the guide pin 216 of the shaft lever 214 causing the guide pin 216 to move along the arc-shaped hole 213 and prompting the shaft lever 214 to rotate along the fulcrum 215. As such, the lever head 217 at the other end moves forward to push the flange 241 causing the slider 240 to move forward. Again referring to FIG. 5, as the gear rack 243 on the slider 240 also moves forward and engages the second gear transmission member 235, the second gear transmission member 235 continues to move the slider 240 against the forward movement of the spring 245. After the disc is in place, the inclined guide surface 244 of the slider 240 pushes the protruding axle pin 239 of the roller 233, causing the roller 233 to descend and move away from the disc surface. FIG. 6 shows the restraining device 250 releasing the traverse 220. As shown, the moving of linkage gear 236 along with the outer positioning plate 237 causes the inner positioning plate 238 to descend, which enables the restraining post 251 thereon to move away from the front end of traverse 220. The resulting distance between the restraining post 251 and the traverse 220 increases and becomes greater than the normal vibration magnitude of the traverse 220. As such, the limiting slot 241 that moves forward along with the slider 240 would also release the positioning shaft 222 of the traverse 220 to give the traverse 220 normal vibration space under the shock support of damper.

Thus the restraining device of optical disk drive according to the invention could restrain the vibration range of the traverse by disposing a restraining post on the inner positioning plate of the transmission gear assembly, which ascends along with the roller and blocks the front end of the disc-free traverse, thereby protecting the gears from damage. Or the restraining post would descend along with the roller to move away from the vibration range of the traverse and avoid interfering with the shock absorption mechanism of the traverse during normal read and write, thereby improving the reliability of the optical disk drive.

The preferred embodiments of the invention have been disclosed in the examples. However the examples should not be construed as a limitation on the actual applicable scope of the invention, and as such, all modifications and alterations without departing from the spirits of the invention shall remain within the protected scope and claims of the invention.

What is claimed is:

1. A restraining device of optical disk drive disposed inside an optical disk drive, the optical disk drive being disposed with a traverse, where a transmission unit rotates a roller to load/unload a disc and drives a slider to move the roller, the transmission unit being disposed with a restraining device that moves with the roller; wherein when the optical disk drive does not carry a disc, the slider moves to restrain the traverse and release the roller, while the restraining device moves close to the traverse to retrain the vibration range of the traverse; when the optical disk drive carries a disc, the slider moves to release the traverse and push down the roller to move the restraining device away from the vibration range of the traverse; and wherein the transmission unit further includes a gear transmission set disposed on the side of the traverse, the gear transmission set comprising a first gear transmission member, a second gear transmission member, and a linkage gear that transmit interactively, the first gear transmission member being used to rotate the roller, the second gear transmission member being used to drive the slider, the linkage gear being linked up with the first gear transmission member and the second gear transmission member with an inner positioning plate and an outer positioning plate respectively to move interactively with the first gear transmission member and the second gear transmission member, the restraining device being disposed in the positioning plate.

2. The restraining device of optical disk drive according to claim 1, wherein when the restraining device moves close to the traverse, the distance between the restraining device and the traverse is smaller than the vibration magnitude of the traverse.

3. The restraining device of optical disk drive according to claim 2, wherein when the restraining device moves close to the traverse, the distance between the restraining device and the traverse is less than 2 mm.

4. The restraining device of optical disk drive according to claim 1, wherein when the optical disk drive does not carry a disc, the restraining device moves to the front end of the traverse to restrain the vibration range of the traverse.

5. The restraining device of optical disk drive according to claim 1, wherein restraining device is disposed on the inner positioning plate that links up the linkage gear and the second gear transmission member.

6. The restraining device of optical disk drive according to claim 5, wherein the inner positioning plate is protrudingly disposed with a restraining post inwardly towards the optical disk drive to form a restraining device.

7. The restraining device of optical disk drive according to claim 1, wherein the slider is pulled and secured at the rear end of the optical disk drive by a spring when the optical disk drive does not carry a disc such that the gear rack on the slider disengages the second gear transmission member and forms a space therebetween, said space exceeding the distance of movement by the restraining device towards the traverse.

8. The restraining device of optical disk drive according to claim 7, wherein the slider moves to push down the roller when the optical disk drive carries a disc which causes the positioning plate to descend such that the restraining device on the positioning plate moves away from the vibration range of the traverse.

* * * * *